United States Patent Office

2,862,890
Patented Dec. 2, 1958

2,862,890

REACTIVATION OF REFORMING CATALYSTS

James P. Daugherty, Jr., Swarthmore, Pa., assignor to Sun Oil Company, Philadelphia, Pa., a corporation of New Jersey No Drawing. Application October 20, 1952
Serial No. 315,853

3 Claims. (Cl. 252—412)

This invention relates to the reactivation of catalyst used in hydrocarbon conversion operations and more particularly to the reactivation of reforming catalysts of the type comprising a small amount of platinum on a metal oxide carrier.

The use of platinum-containing catalysts for reforming hydrocarbon fractions in the presence of hydrogen is well known and such catalysts have been used successfully in commercial reforming operations. In the reforming process dehydrogenation of naphthenes to aromatic hydrocarbons occurs along with other reactions such as isomerization, cracking and cyclization. The platinum-containing catalysts generally are specially prepared with the view of securing a controlled amount of hydrocracking so as to avoid carbon deposition on the catalyst, and also with the view of producing as high a proportion as possible of aromatic products, for example, benzene. Formation of aromatics in high amount is dependent upon the ability of the catalyst to isomerize cyclopentanes to cyclohexanes as well as its ability to dehydrogenate cyclohexanes to the corresponding aromatic hydrocarbons, and the catalysts are generally specially made so as to secure the desired isomerizing ability while suppressing the cracking activity to a controlled extent.

The catalysts which have been most successful in hydroforming operations comprise a small amount of platinum, generally between 0.1% and 2.0% by weight and usually of the order of 0.3–0.7%, incorporated in a suitable metal oxide carrier, usually alumina or a mixture of alumina and silica. The carrier material usually has been subjected to some special treatment in order to regulate the isomerizing and cracking activities or to improve other properties of the catalyst for more satisfactory use in the reforming operation. Examples of such special treatments are disclosed in Haensel Pat. No. 2,479,109 wherein the alumina base is combined with a halogen such as fluorine, and in Ciapetta Pat. No. 2,550,531 wherein the silica-alumina base is treated with steam at a high temperature to regulate its surface area within certain limits.

It has been found in practice that the platinum-containing catalysts, if suitably prepared, can be used continuously for several months in the hydroforming of hydrocarbons before their activity drops to such extent as to become uneconomicaly low. This allows the reforming operation to be conducted as a non-regenerative process and thus simplifies the plant and reduces costs by avoiding any necessity of providing for frequent periodic regeneration. It is therefore customary practice to use a batch of the platinum-containing catalyst for a relatively long period until its activity reaches an uneconomic level and then replace it with freshly prepared catalyst. Due to the high cost of platinum, however, it is essential that the platinum be recovered from the deactivated catalyst, and this has necessitated the employment of expensive operations adapted to separate platinum from the used catalyst. While a major proportion of the platinum is thus recovered, the expense involved is reflected in the overall costs of conducting the hydroforming operation, and additionally some loss of platinum inevitably occurs which adds further to the cost of the process.

In accordance with the present invention, the customary practice of recovering platinum from the used catalyst is avoided by utilizing a relatively inexpensive treatment which restores the activity of the catalyst essentially to its original value. This treatment involves resurfacing the deactivated catalyst by incorporating thereon platinum in a proportion which is small compared to the platinum content of the original catalyst. It has been found that the decline in catalyst activity during prolonged use is not necessarily due to accumulative poisoning but rather to some structural rearrangement such as migration of platinum from the surface areas into the body of the catalyst or agglomeration of platinum at points on the surface. A very small amount of platinum properly distributed on the carrier surface is sufficient to produce an effective catalyst, while a relatively large amount improperly distributed is ineffective. Regardless of what the exact mechanism may be, redistribution of platinum in the catalyst occurs in some manner during prolonged use in hydroforming and this accounts for gradual loss in catalyst activity. Accordingly the activity can be restored in a relatively inexpensive manner by incorporating a very small additional amount of platinum in the catalyst with proper distribution over its surface areas.

More specifically stated, the process of the invention comprises reactivating a used reforming catalyst which initially contained 0.1–2.0% platinum by weight by treating the deactivated catalyst with a platinum-containing solution in amount to provide a relatively small additional amount of platinum in the final catalyst composition, and then calcining the treated catalyst. The amount of platinum-containing solution should be such as to provide 0.01–0.1% by weight additional platinum based on the final catalyst composition but less than one-half the amount of platinum that was present in the deactivated catalyst. Generally less than one-fifth such amount will suffice to restore the catalyst activity essentially to its original value. For example, commercial catalysts usually have an initial platinum content of 0.3–0.7%, and these can readily be reactivated by incorporating in the used catalyst 0.05–0.15% platinum.

The treatment of the used catalyst with a platinum-containing solution and calcining of the treated composition can be carried out in a manner similar to that used in preparing the original catalyst. Conditions of preparing platinum-containing catalyst are well known and need not be described in detail here; see, for example, Haensel Pat. No. 2,479,109. Usually a solution of chloroplatinic acid of suitable concentration and amount, calculated from the known surface area of the carrier and the amount of platinum that is desired to be incorporated in the catalyst, is mixed with the carrier and the mixture is then calcined at a temperature within the range of 800–1200° F. This or other known procedures for depositing platinum on the carrier surfaces can be used in reactivating the catalyst according to the present invention. In treating the deactivated material by any of these procedures, it is of course desirable that the additional amount of platinum incorporated into the used catalyst exceed the minimum amount of 0.01% specified above by as little as possible consistent with securing the desired reactivation in order to avoid unnecessary costs.

The present invention may be applied several times to the same batch of catalyst to restore its activity periodically after extended periods of use. Eventually the platinum content of the catalyst may become high enough that it may become desirable to recover it to reduce the investment representing platinum tied up in the operation, or the condition of the carrier material may become such as to make it desirable to discard the catalyst from use in the hydroforming operation and recover platinum therefrom. In such case the loss of platinum and overall cost will be greatly reduced as compared with the conventional practice of recovering platinum from the catalyst each time its activity has dropped to an uneconomic level.

The following is an illustrative example of the invention. A catalyst prepared by washing alumina gel with acetic acid, treating the washed gel with a solution of chloroplatinic acid in amount to yield a final catalyst containing about 0.5% platinum by weight and then calcining, is used in a hydroforming operation adapted particularly to produce benzene and toluene from a straight run naphtha containing $C_6$ and $C_7$ naphthenes. The charge naphtha has an A. S. T. M. boiling range of 168° F. to 210° F. and contains 45% naphthenes and 5% aromatic hydrocarbons. The charge is hydroformed in a plant having four reactor cases in series at a pressure of 300 p. s. i. g., an inlet temperature to each reactor of 950° F., a space rate of 3.0 liq. vol./vol. of catalyst/hr. and a hydrogen recycle ratio of 5 moles/mole of charge. At the beginning of the operation the yields of benzene and toluene produced, expressed as vol. percent of the charge and not including the benzene and toluene present in the charge, are 12.5% and 22.5% respectively. After 90 days operation under these conditions, the yields of benzene and toluene formed in the reaction have dropped to 11.0% and 18.5%. These reductions in yields, while not particularly large, tend to render the operation uneconomic due to the substantial distillation costs in preparing the feed stock for the process. The catalyst is therefore removed from the reactor cases, treated with an aqueous solution of chloroplatinic acid and then calcined. The resulting catalyst has a platinum content which is about 0.05% higher than that of the original catalyst. The treated catalyst is then placed in the reactor cases and the plant is again operated with the same naphtha charge and under the same conditions. It is found that the yields of benzene and toluene formed in the reaction again are 12.5% and 22.5% respectively.

I claim:

1. Method of reactivating a reforming catalyst comprising a metal oxide carrier and platinum in amount of 0.1–2.0% by weight and which has undergone loss in activity during prolonged use in the reforming of hydrocarbons in the presence of hydrogen, which comprises treating the deactivated catalyst, containing essentially all its platinum as obtained from such reforming operation, with a platinum-containing solution in amount to provide in the final catalyst composition 0.01–0.1% by weight additional platinum but less than one-half the amount of platinum that was present in the deactivated catalyst and calcining the treated catalyst.

2. Method of reactivating a reforming catalyst containing 0.3–0.7% platinum on an aluminum oxide carrier and which has undergone loss in activity during prolonged use in the reforming of hydrocarbons in the presence of hydrogen, which comprises treating the deactivated catalyst, containing essentially all its platinum as obtained from such reforming operation, with a platinum-containing solution in amount to provide in the final catalyst composition 0.01–0.1% by weight additional platinum and calcining the treated catalyst.

3. Method of reactivating a reforming catalyst containing, on a metal oxide carrier, platinum in an amount and so distributed as to impart to the catalyst the activity required in the process of reforming hydrocarbon in the presence of hydrogen, which platinum during prolonged use in such process has undergone migration with resulting structural rearrangement in the catalyst and impairment of catalytic activity, which comprises treating the thus deactivated catalyst, containing essentially all its platinum as obtained from such reforming process, with a platinum-containing solution in amount adequate to deposit on the catalyst surface additional platinum substantially less in amount than one-half the amount previously contained in the catalyst but adequate to restore to the catalyst substantially its original activity and calcining the treated catalyst.

References Cited in the file of this patent

UNITED STATES PATENTS

| | | |
|---|---|---|
| 2,579,123 | Pardee | Dec. 18, 1951 |
| 2,611,736 | Haensel | Sept. 23, 1952 |
| 2,623,860 | Haensel | Dec. 30, 1952 |
| 2,635,080 | Appell | Apr. 14, 1953 |